United States Patent [19]

Yazdy

[11] Patent Number: 5,812,815
[45] Date of Patent: Sep. 22, 1998

[54] ADDRESS TENURE CONTROL FOR CACHE MANAGEMENT WHEREIN BUS MASTER ADDRESSES ARE INTERNALLY LATCHED IN A CACHE CONTROLLER

[75] Inventor: Farid A. Yazdy, Belmont, Calif.

[73] Assignee: Apple Computer, Inc., Cupertino, Calif.

[21] Appl. No.: 430,450

[22] Filed: Apr. 28, 1995

[51] Int. Cl.$^6$ .................................................. G06F 13/00
[52] U.S. Cl. ................................... 395/467; 364/DIG. 1; 395/445; 395/468; 395/473; 395/481; 395/496
[58] Field of Search .................................. 395/445, 467, 395/468, 473, 481, 496

[56] References Cited

U.S. PATENT DOCUMENTS

| | | | |
|---|---|---|---|
| 4,547,845 | 10/1985 | Ross | 364/200 |
| 4,817,037 | 3/1989 | Hoffman et al. | 364/200 |
| 4,896,256 | 1/1990 | Roberts | 364/200 |
| 5,073,851 | 12/1991 | Masterson et al. | 395/425 |
| 5,237,567 | 8/1993 | Nay et al. | 370/85.1 |
| 5,339,399 | 8/1994 | Lee et al. | 395/425 |
| 5,347,648 | 9/1994 | Stamm et al. | 395/575 |
| 5,353,429 | 10/1994 | Fitch | 395/425 |
| 5,355,467 | 10/1994 | MacWilliams et al. | 395/425 |
| 5,375,215 | 12/1994 | Hanawa et al. | 395/425 |
| 5,377,324 | 12/1994 | Kabemoto et al. | 395/200 |

FOREIGN PATENT DOCUMENTS

| | | |
|---|---|---|
| 0405223 | 1/1991 | European Pat. Off. . |
| 0559409 | 9/1993 | European Pat. Off. . |

OTHER PUBLICATIONS

"Separating the Interaction of Address and Data State During Bus Data Transfers," IBM Technical Disclosure Bulletin, vol. 37, No. 5, May 1994, New York, USA, pp. 337–338.
"Peripheral Component Interconnect Target/60X Snoop Cycle," IBM Technical Disclosure Bulletin, vol. 38, No. 3, Mar. 1995, pp. 469–471.
*PowerPC™ 601, RISC Microprocessor User's Manual*, Motorola Inc. 1993, pp. 6–16–6–17;9–1–9–12; and 9–18–9–19.

*Primary Examiner*—Frank J. Asta
*Attorney, Agent, or Firm*—Burns, Doane, Swecker & Mathis, L.L.P.

[57] ABSTRACT

Systems and methods which provide a minimized address tenure to create more efficient memory transactions where the address is not needed for longer than the initial clock cycle in which it is used are described. The exceptions, for example, wherein the address is needed later during the transaction to perform a cache operation, are handled by reasserting the address using the cache controller. In this way, memory transactions are made more efficient but without the use of external latches conventionally used to preserve the deasserted address.

11 Claims, 5 Drawing Sheets

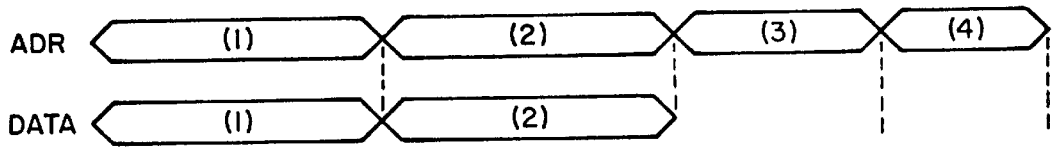
FIG_1
(PRIOR ART)
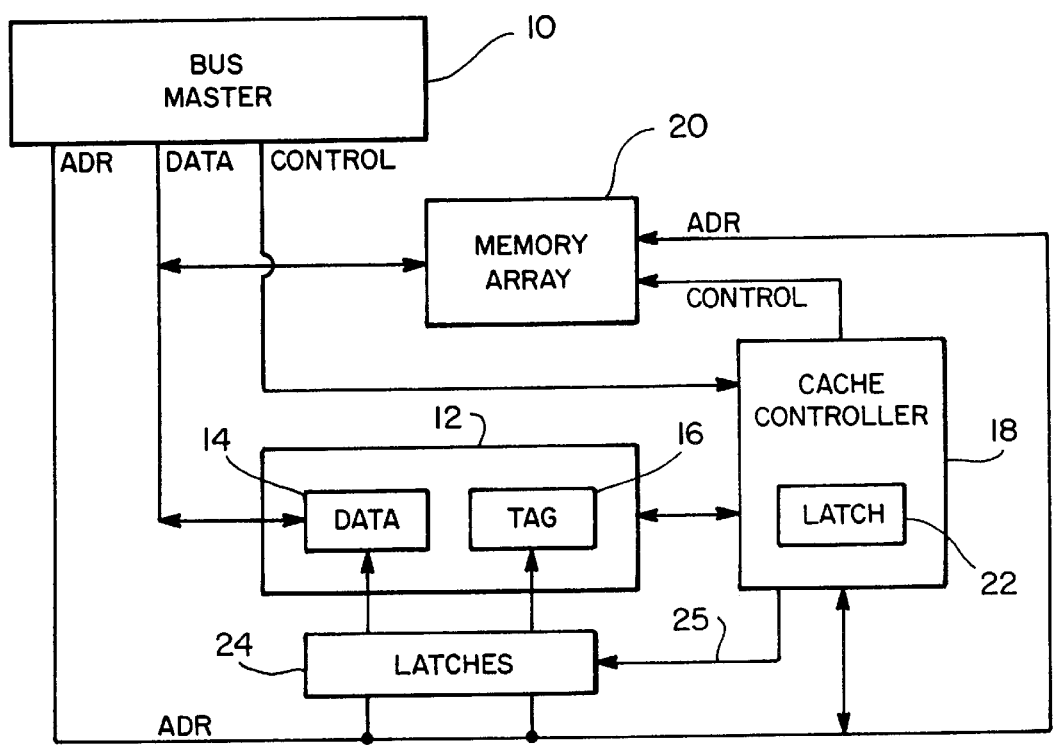
FIG_3
(PRIOR ART)

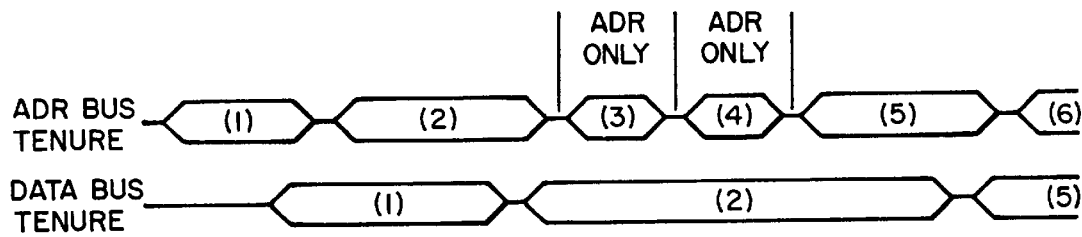
FIG_2
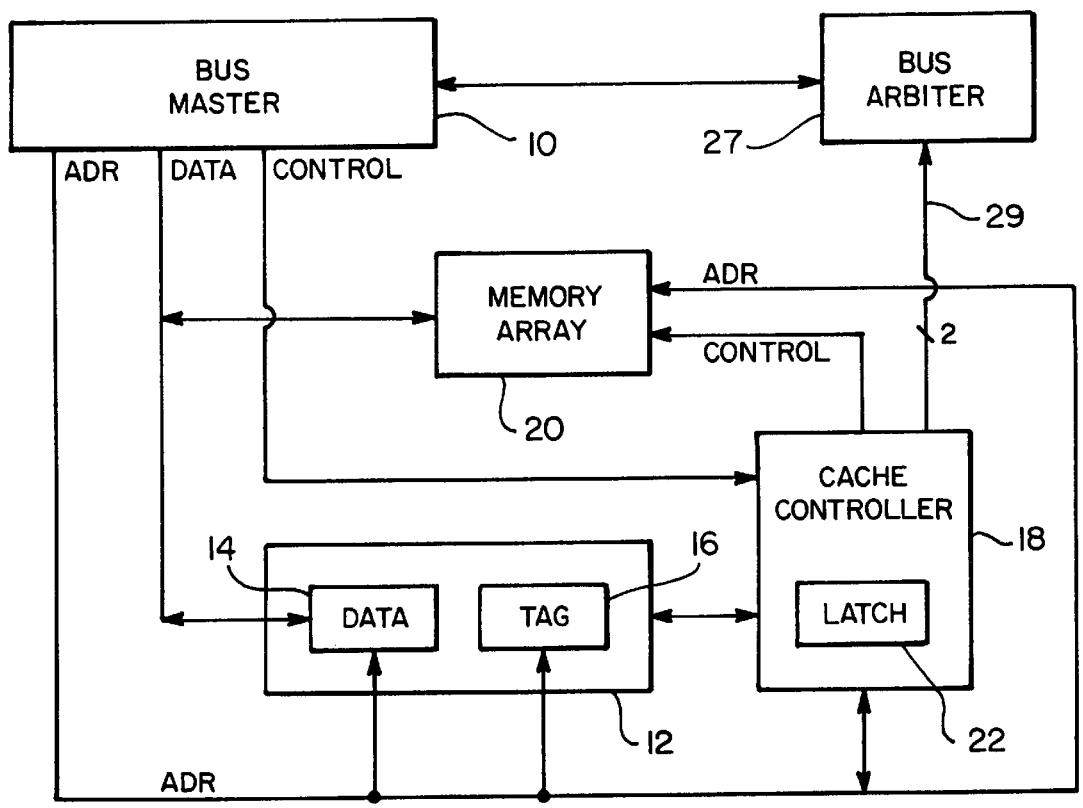
FIG_5

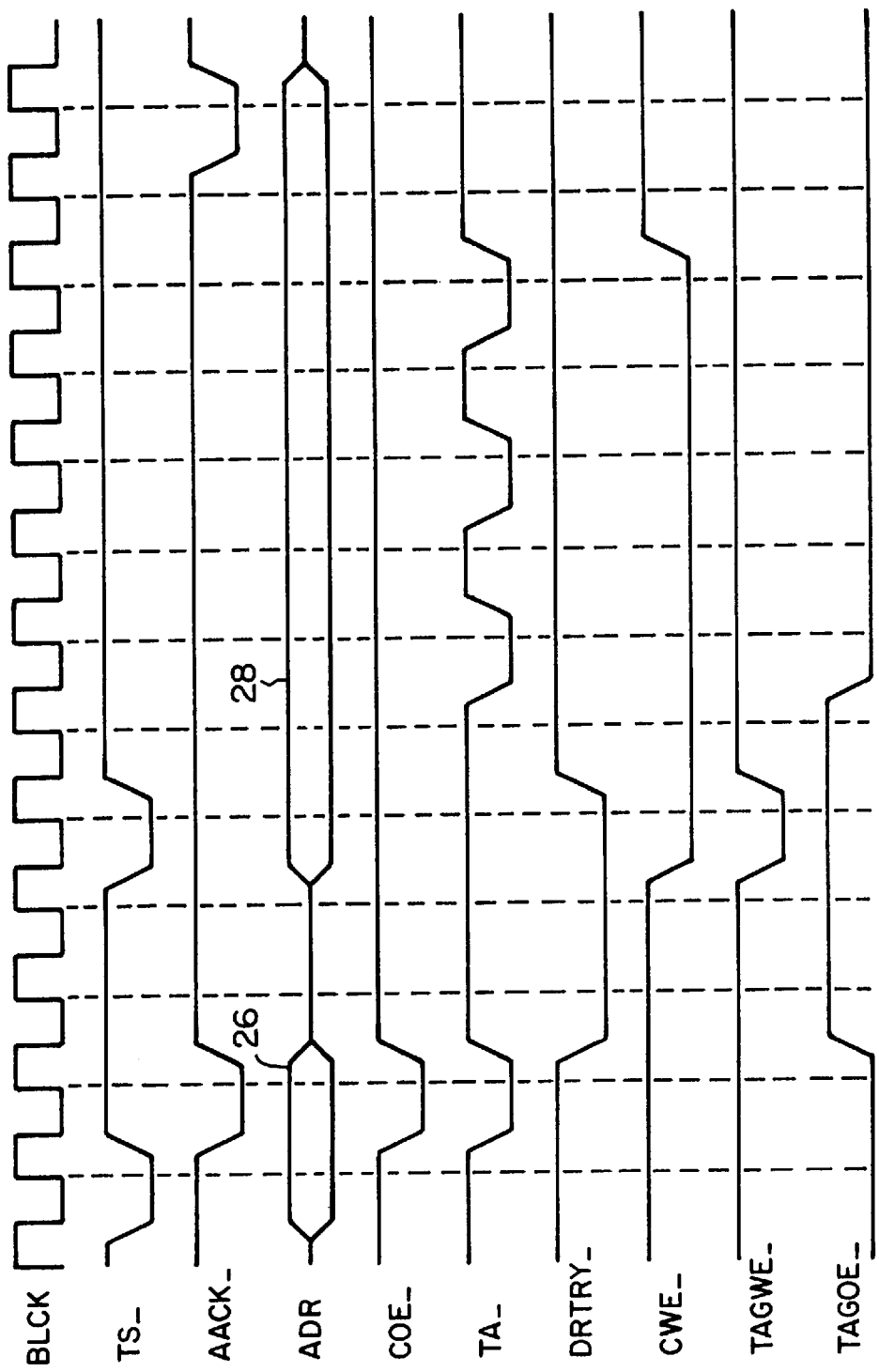
FIG_4 (PRIOR ART)

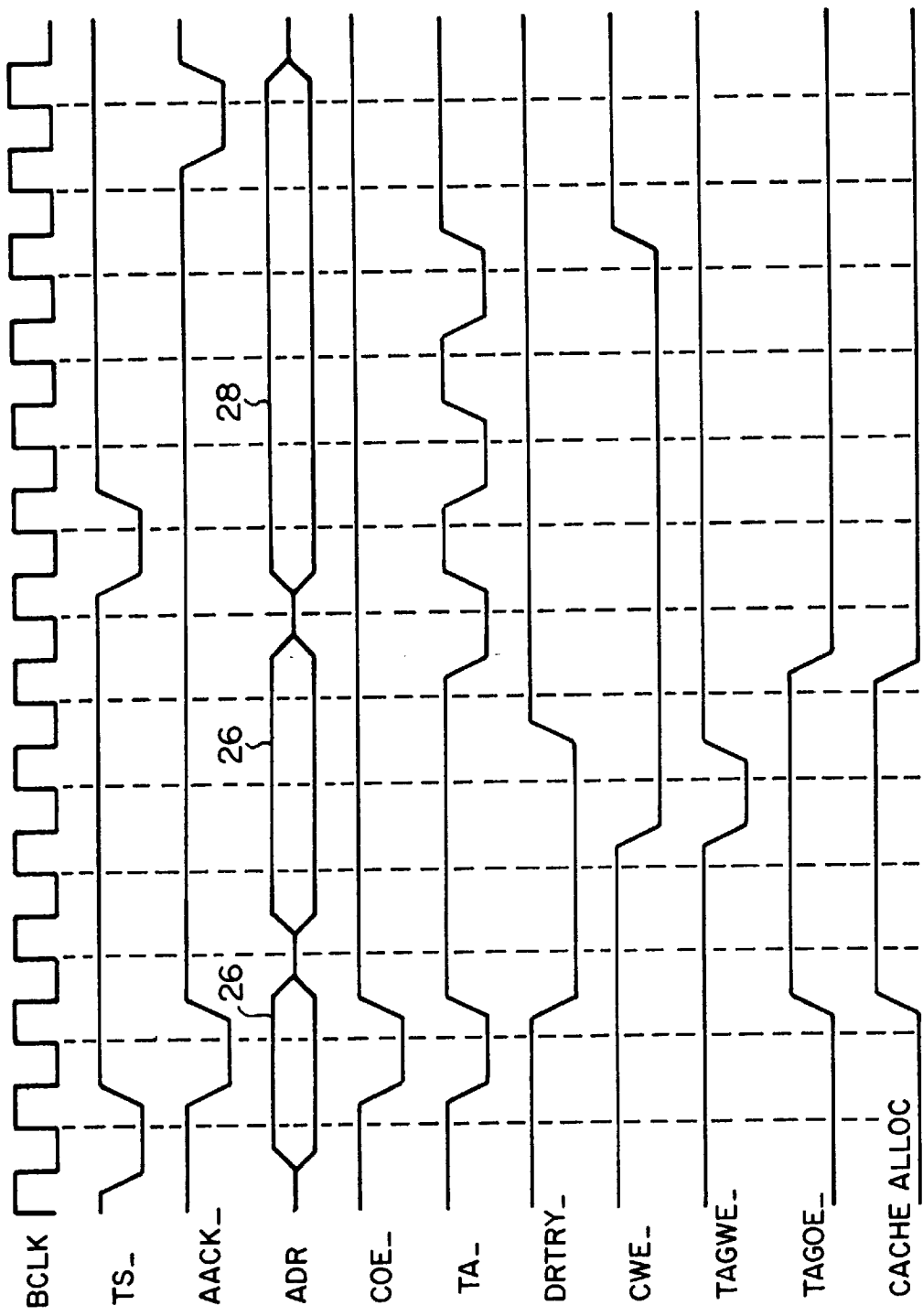
FIG_6

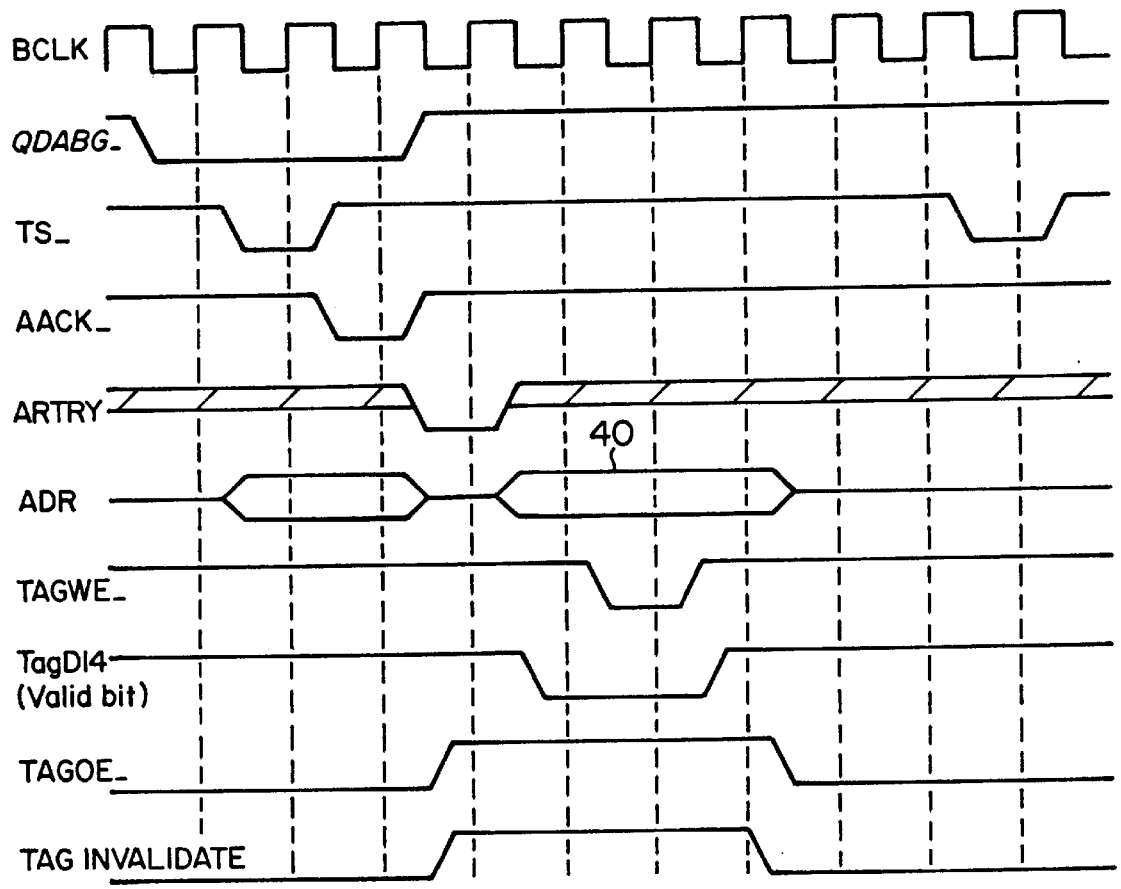
FIG_7
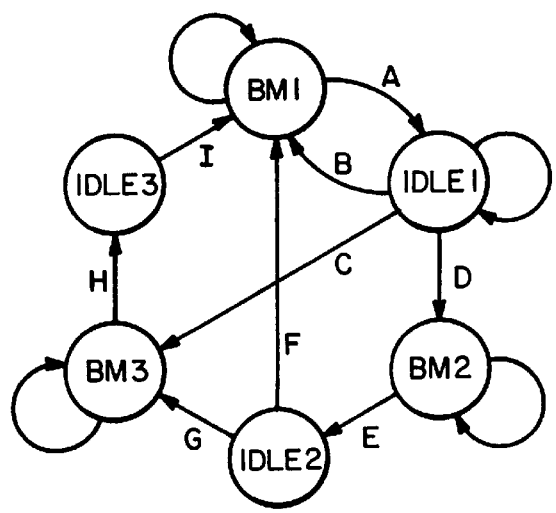
FIG_8

ADDRESS TENURE CONTROL FOR CACHE MANAGEMENT WHEREIN BUS MASTER ADDRESSES ARE INTERNALLY LATCHED IN A CACHE CONTROLLER

RELATED APPLICATIONS

This application is related to U.S. patent application Ser. No. 08/430,451, still pending, entitled "Address and Data Bus Arbiter for Pipelined Transactions on a Split Bus" to Farid Yazdy and to U.S. patent application Ser. No. 08/430,452, still pending, entitled "Address Bus Arbiter for Pipelined Transactions on a Split Bus" to Farid Yazdy, both of which are filed on an even date herewith, and both of which disclosures are incorporated here by reference.

BACKGROUND

The present invention relates generally to digital computers and, more specifically, to cache memory management in digital computers.

As the performance demands on digital computers continue to increase at a meteoric pace, processors have been developed which operate at higher and higher clock speeds. The instruction sets used to control these processors have been pared down (e.g., RISC architecture) to make them more efficient. Processor improvements alone, however, are insufficient to provide the greater bandwidth required by computer users. The other computer subsystems which support the processor, e.g., I/O devices and memory devices, must also be designed to operate at higher speeds and support greater bandwidth. In addition to improved performance, cost has always been an issue with computer users. Thus, system designers are faced with the dual challenges of improving performance while remaining competitive on a cost basis.

Cache memory systems were designed with these competing goals in mind. If the processor must wait for a memory system to access data, then the memory system becomes a bottleneck and reduces system efficiency. The ready solution of devising and incorporating the fastest possible memory devices as the entire digital computer memory is rather uneconomical given the large amounts of memory used in today's digital computers and because, typically, the faster the memory device, the greater the cost of that device. Cache memories are essentially high-speed buffers for holding data which provide an interface between the processor and the main memory. By adding a cache memory between a fast processor and a slower (than the cache) memory system, a designer can provide an apparently fast memory at an affordable cost.

This ability of a cache system stems from a general tendency of many programs to access data and program instructions that either have been recently accessed or are located in nearby memory locations. If the processor needs data that is not resident in the cache, a cache "miss", it accesses the main memory array. The data fetched from the main memory array then replaces some of the data in the cache with the expectation that it will be needed again soon. Properly implemented, the rate at which data is found in the cache, the cache "hit" rate, can be in excess of 90% of all accesses depending upon the type of software and data structures being implemented.

Cache memories are commonly divided into two sections, a data storage section (for example, a high speed storage device such as SRAM) which holds and delivers the data and a tag storage section which stores the corresponding main memory address (or portion thereof) of a datum stored in the data storage section. When the processor initiates a memory read operation, the processor sends the physical address associated with the memory access to a cache controller which internally latches the address for operation. The cache controller compares the physical address in the internal latch(es) with the tags which are currently stored in the tag storage section. If the cache controller finds a match, then a cache hit has occurred and the corresponding datum is retrieved from the data storage section and forwarded to the processor. If the cache controller does not find a match, then a cache miss has occurred and the corresponding datum is retrieved from main memory, forwarded to the processor and stored in the cache data storage section. Thus, in order to handle cache misses, the cache controller needs to retain the internally latched address of the datum long enough to store the data retrieved from the main memory and update the tag section with the address.

The addresses and data conveyed in memory transactions can be provided on separate buses whose timing is synchronized such that the periods during which an address and its associated datum are asserted on their respective buses, known as the "address tenure" and "data tenure," are the same. This concept is illustrated in FIG. 1 by the co-terminous address and data cycles (1) and (2). Cycles (3) and (4) are address-only cycles which have no corresponding data tenures. In such unpipelined systems, the cache memory will be presented with a valid address until the end of the memory cycle and will be able to update the data storage section and tag section as needed.

Other systems, however, provide address pipelining which permits a new bus transaction to begin before a current transaction has finished. This is achieved by overlapping the data bus tenure associated with a previous address bus tenure with one or more successive address tenures. This concept can be seen in FIG. 2 wherein the address tenure of cycle (2) begins before the data tenure of cycle (1) is completed. Address pipelining can be used to improve memory throughput, for example in systems having address-only cycles which can be completed while the data tenure of an earlier address and data cycle is being completed. For example, note that address-only cycles (3) and (4) of FIG. 2 can be completed during the time that it would have taken the scheme of FIG. 1 to complete the first two cycles.

However, a subsequent address asserted on the address bus which overlaps the data tenure of a previous address will replace the previous address both on the address bus and in the internal latch of the cache controller. This creates a problem when the cache controller needs the previous address later in the data tenure of the original memory cycle, for example, to allocate new data from the main memory to the cache after a cache miss.

One way to overcome this problem is to continue to assert the original address on the address bus for as long as it may be needed. In this way, the cache controller will continue to have access to this address on the address bus for cache operations. The drawback to this solution is that delaying the address acknowledge signal until the data received from the cache has been evaluated slows down the processing for cache hits by at least one clock cycle. Since cache memories are designed for a cache hit rate of at least 90%, this solution is unacceptable in terms of processing speed.

In order to promote the most efficient processing of cache hits, it should instead be presumed that each read is a cache hit such that the address transfer is acknowledged on the first possible cycle after the start of the memory access. This optimizes cache hit processing speed, but requires a solution for cache miss address loss. One conventional solution, which does not rely on increasing the address tenure, is to provide one or more external latches (depending on the amount of pipelining, the number of bits per latch, etc.) to retain one or more addresses under the control of the cache controller until those addresses are no longer needed for cache operations. In this way, even if a new address is asserted on the address bus while the cache controller still needs the original address to perform cache operations (e.g., cache allocation or cache tag invalidation), the cache controller can still provide the original address to the data and/or tag section of the cache. This solution, which is described in more detail below, has several drawbacks including the added expense of providing external latches and the added complexity created by requiring the cache controller to control these external latches in addition to its other functions.

SUMMARY

According to exemplary embodiments of the present invention, these and other drawbacks and limitations of the aforedescribed solutions for cache management are overcome in systems wherein the cache controller reasserts an internally latched address and a bus arbiter holds off the address bus from other potential bus masters. In this way, the cache controller retains access to the address during certain memory cycles, such as cache invalidation or cache allocation, without requiring expensive external latches (and their additional control complexity) to store this address information. Moreover, exemplary embodiments of the present invention acknowledge address transfer as early as the bus clock cycle following the signal initiating the memory cycle transaction so that cache read hit performance, for example, is not degraded.

According to another exemplary embodiment, other types of memory accesses can also be optimized, such as certain types of DMA transactions, wherein main memory is changed without writing to the cache. In these types of transactions, coherency is maintained by invalidating a tag in the cache if an image of the datum written directly to memory resides in the cache. Analogously to the cache allocation cycles, however, it is speed-wise advantageous to presume that the cache does not contain an image and release the address bus immediately for the next address cycle. If the cache does have an image, then the cache controller drives the address bus during a cache invalidation cycle to invalidate the tag while the bus arbiter holds off other potential bus masters.

BRIEF DESCRIPTION OF THE DRAWINGS

The foregoing, and other, objects, features and advantages of the present invention will be more readily understood upon reading the following detailed description in conjunction with the drawings in which:

FIG. 1 illustrates conventional synchronized address and data bus tenures;

FIG. 2 illustrates pipelined, overlapping address and data bus tenures;

FIG. 3 is a block diagram representation of a conventional memory system;

FIG. 4 is a timing diagram illustrating a cache allocation cycle according to the conventional system of FIG. 3;

FIG. 5 is a block diagram representation of a memory system according to an exemplary embodiment of the present invention;

FIG. 6 is a timing diagram illustrating a cache allocation operation of the system of FIG. 5;

FIG. 7 is a timing diagram of a cache invalidation cycle according to an exemplary embodiment of the present invention; and FIG. 8 is a state diagram of an address arbiter according to an exemplary embodiment of the present invention.

DETAILED DESCRIPTION

To obtain a complete understanding of the present invention and all of its concomitant advantages, a detailed discussion of a conventional solution will first be provided followed by exemplary embodiments of the present invention. Thus, FIG. 3 is a block diagram representation of a portion of a conventional memory system. Therein, the various blocks described below are interconnected by way of three buses which are well known in the art, namely an address bus, a data bus and a control bus. The bus master 10 can be any device which can acquire control over the address and/or data buses, for example a central processor or a special processor devoted to specialized functions. Those skilled in the art will appreciate that contemporary computer architecture frequently provides multiple processors or bus masters which share common resources such as the memory devices illustrated in FIG. 3. These additional bus masters 10 could be added to the system of FIG. 3 and operate in accordance with the following description. Block 12 depicts the cache memory within which the data section 14 and tag section 16 are disposed. A cache controller 18 is illustrated in FIG. 3 as providing control signals for both the cache memory 12 and the main memory array 20.

The cache controller 18 includes an internal latch 22 for performing operations on the contents of the address bus, such as comparing the currently asserted address with those found in the tag section 16 of the cache to identify the transaction as a cache hit or miss. The external latch(es) 24 retain one or more addresses for later supply to the cache data and tag sections 14 and 16 as controlled by the cache controller 18. The cache controller uses one or more control lines, generally illustrated in FIG. 3 by control line 25, to selectively output one of a latched address or the address currently being driven on the address bus to the data 14 and/or tag 16 sections of the cache.

Using the conventional configuration of FIG. 3, the address bus can be quickly deassserted for use by any waiting bus master, while also retaining the ability to provide an address from a previous cycle to the cache. This process will be described with respect to the timing diagram of FIG. 4 which illustrates a cache burst read miss operation. In order to more fully appreciate the timing signals described herein, the following table describes the illustrated labels therein in more detail.

| TIMING SIGNAL LABEL DESCRIPTIONS | |
|---|---|
| BCLK | Bus Clock |
| TS | Transaction Start |
| AACK | Address Acknowledge - Bus Master can stop driving address |
| ADR | Address Tenures on Address Bus |
| COE | Cache Output Enable |
| TA | Transaction Acknowledge - Data Tenure ending |
| DRTRY | Data Retry - wait for valid data |
| ARTRY | Address Retry - restart address cycle |
| CWE | Cache (Data Section) Write Enable |
| TAGWE | Tag Write Enable |

TIMING SIGNAL LABEL DESCRIPTIONS

| | |
|---|---|
| TAG INVALIDATE | Signals Beginning of Tag Invalidation Cycle |
| CACHE ALLOC | Signals Beginning of Cache Allocation Cycle |
| TAGOE | Tag Output Enable |

A cache allocation cycle brings a new data line or block into the cache data section 14 and marks the corresponding tag location in block 16 as valid. Cache allocation is performed when, for example, a cache miss has occurred and the processor retrieves data from main memory. During the allocation cycle, the data bus content is written into the cache data section 14 and, for example, part of the address bus content is written into the tag section 16. However, in order to perform this operation successfully, the address found on the address bus must correspond to the location from which the data found on the data bus was retrieved from the main memory array 20. Otherwise the data will be written to the wrong portion of the cache. In the conventional system of FIG. 3, this is achieved by controlling the external latch(es) 24 via control line(s) 25 to supply the latched address to the cache 12 rather than the address currently being driven on the address bus as described below.

The bus clock in FIG. 4 provides timing signals which allow synchronization of operations on the various buses of FIG. 3. Each clock cycle includes a high and low bus clock period and is indicated by the dotted lines in FIG. 4. A memory transaction begins when the TS signal is asserted on a control line (not shown) of the control bus. At the same time, the bus master for this transaction asserts an address 26 on the address bus as shown by the first elongated hexagon on the address bus timing signal. The cache controller 18 uses the address asserted on the address bus by the bus master 10 to put data, if available in the cache 12, on the data bus by enabling the cache output at the second clock cycle. At the same time, the cache controller acknowledges that the data has been placed on the data bus by driving the timing signal TA low and ends the address tenure on the address bus by also driving AACK low. This allows the next cycle to begin rapidly if the data placed on the data bus is valid, i.e., a cache hit.

In the particular example illustrated in FIG. 4, however, the cache does not contain an image of the data requested by the bus master 10, i.e., a cache miss. Thus, the data must be retrieved from the main memory 20 and this process is initiated by driving the timing signal DRTRY low during the third clock cycle as illustrated in FIG. 4. In this way, the bus master 10 will recognize that the first TA low signal was inaccurate and that the data must be retrieved from the main memory array 20. However, the address 26 driven by the bus master 10 was deasserted when the AACK signal driven low and thus the address needed to allocate this data to the cache is not available on the address bus. In fact, by the time that the data has been retrieved from main memory and the cache has been write enabled, i.e., the fifth clock cycle, another memory transaction has begun and a new address 28 asserted on the address bus.

Accordingly, the cache controller 18 enables the external latch(es) 24 to provide the latched address 26 to the cache memory system 12 for storing the data retrieved from main memory and the tag information. After the cycle is completed, the cache controller 18 can then enable the external latch(es) to retain the contents of the address bus (e.g., address 28).

Unfortunately, this conventional solution requires the provision of one or more external latches which are expensive additional components. Moreover, these external latches, like many digital components, are manufactured in bulk at power of two (e.g., 8, 16, 32) bit sizes. However, the address information needed by the tag and data sections of the cache 12 may be only a portion of the total address information driven on the address bus. For example, consider a 32 bit address bus wherein only bits A12 to A28, i.e., 17 bits, are needed to address the cache. Latching 17 bits of data using bulk manufactured external latches results in a waste of capacity. For example, two 16 bit external latches would be needed even though only one bit of one of the latches would be needed. Still another drawback is the additional control lines and logic needed for cache controller 18 to control these external latches.

According to exemplary embodiments of the present invention, the internal latch 22 of cache controller 18 can be used to retain the memory address asserted on the address bus which can later be driven by the cache controller 18 acting as a bus master. In this way, the address which was deasserted by the bus master upon reception of the AACK signal can be recovered to perform cache operations without the provision of external latches. Thus, this exemplary embodiment can be depicted as shown in FIG. 5. Like reference numerals are used in FIGS. 5 and 6 to refer to similar elements and events shown in FIGS. 3 and 4, and reference should be made to the above-description with respect thereto. Note, however, that the system of FIG. 5 omits the external latch(es) 24 and control line(s) 25 which are avoided by practicing the present invention.

Also note that FIG. 5 includes a bus arbiter 27 which receives bus requests from bus master 10 and issues bus grants thereto. Bus arbiter 27 will also prioritize bus requests from bus master 10 and other bus masters not illustrated in FIG. 5. Cache controller 18 is linked to bus arbiter 27 to indicate when it needs the address and data buses to perform an operation. To further illustrate these inventive concepts, a cache allocation cycle analogous to that of FIG. 4 and a cache invalidation cycle according to the present invention will now be described with respect to FIGS. 6 and 7, respectively.

As with the cache allocation cycle of FIG. 4, the cycle of FIG. 6 begins with the bus master 10 driving TS low and driving the original address 26 on the address bus. To ensure rapid processing of, for example, cache read hits, AACK and TA are driven low by the cache controller 18 in the next clock cycle. This assumes a cache hit which provides speedy processing of transactions which actually are cache hits. FIG. 6, however, depicts handling of a cache read miss, wherein the bus master is informed of the invalidity of the TA signal by driving DRTRY low in the third clock cycle. The data is then retrieved from main memory 20 and supplied to the bus master 10 and the cache 12.

Since the retrieved data is not currently found in cache 12, the cache controller 18 performs a cache allocation. According to the present invention, the cache controller 18 then activates the CACHE ALLOC signal on signal line 29 to inform the bus arbiter (described below) that a cache allocation cycle is about to begin. The bus arbiter will then prevent other bus masters from acquiring the address bus while the cache controller 18 is using it for this operation. Unlike the conventional system of FIGS. 3 and 4, the original address 26 is now driven on the address bus by the cache controller 18 (as shown by the second elongated hexagon in the ADR timing signal of FIG. 6). The CWE signal is active low during the fifth clock cycle so that this data can be written into data section 14 of the cache. Similarly, TAGWE is activated during the fifth clock cycle to write this address into the tag section 16. The tag output enable is disabled to avoid conflict on the bi-directional bus between the cache controller 18 and the cache 12.

As can be seen from the foregoing, the present invention minimizes address and data tenure thereby providing efficient processing for most transactions but without the use of expensive external latches which wastefully perform this function. If, however, a transaction later requires the deasserted address, it can be reasserted by the cache controller onto the address bus for the necessary cache operation. In addition to cache allocation, another cache operation wherein the cache controller reasserts a deasserted address is cache invalidation. Cache invalidation cycles are initiated in order to maintain cache coherency when data is written to the main memory array 20 but not to the cache 12, for example during background DMA operations which are not directly visible to the system bus. An example of a cache invalidation cycle will now be described with respect to FIG. 7.

Again, the bus clock provides the synchronization for the other signals and the second timing signal from the top of FIG. 7 denotes the granting of the bus to a bus master which will perform a write to main memory 20 which does not pass through the cache 12, for example a DMA transaction. However, as with the previous exemplary embodiment describing cache allocation cycles, the system does not wait to see if a cache operation is needed before asserting AACK and terminating the address tenure in order to speed up cycles which do not require cache operations. The example of FIG. 7 shows the case where a cache operation (i.e., tag invalidation) is needed. Thus, the TS signal is activated during the second clock cycle and in the next clock cycle the AACK signal is activated thereby terminating the address tenure. However, since the cache 12 has an image of the datum which has been written by the bus master to main memory 20, that portion of the cache must be invalidated in order to maintain cache coherency since the cache 12 and the main memory array 20 now have different values for the same address. Accordingly, the ARTRY signal is enabled during the fourth clock cycle to tell the bus master that the cache does have a copy of this datum.

The cache controller 18 also activates the TAG INVALIDATE signal to inform the arbiter 27 that a tag invalidation cycle is about to begin. The bus arbiter 27, as described in more detail below, prevents other bus masters from accessing the address bus during this cycle. Since the address is no longer being driven on the address bus by the bus master 10, it is reasserted by the cache controller as indicated by the second elongated hexagon 40 on the address bus timing signal, so that the cache controller will have access to that address in order to invalidate the corresponding address in the tag section 16. This process is illustrated by activating the TAGWE line during the sixth clock cycle, driving the valid bit low to indicate that this address in the cache is invalid and keeping the TOE line high so that data flows unidirectionally from the memory cache controller 18 to the cache 12 during this operation.

From the foregoing, it will be apparent that another aspect of the present invention is the prevention of other bus masters from asserting an address on the address bus while the cache controller is driving the address bus to perform, for example, a cache allocation or tag invalidation cycle. This can be achieved by providing a bus arbiter which holds off other bus masters by not granting bus requests when the cache controller is performing an operation for which it needs to drive the address bus to provide an address which was deasserted by a bus master. Those skilled in the art will recognize that many different types of arbiters could be designed which provide this function, however exemplary arbiter logic is described below with respect to FIG. 8.

FIG. 8 shows a state diagram for implementing arbitration logic for three bus masters. In addition to the three states wherein the bus masters each control the address bus (i.e., BM1, BM2 and BM3), there are also provided three idle states wherein none of the bus masters are granted access to the bus. The transitions between states have been labelled A–I. The arbiter can transition to the idle states (i.e., transitions A, E and H) when the cache controller needs to perform a cache operation such as cache allocation or cache tag invalidation which require the cache controller to assert an internally latched address onto the address bus. The arbiter recognizes that these cycles are about to commence by receipt of a signal from the cache controller 18 as described above. Interested readers can find other details of the exemplary address arbiter of FIG. 8 in the related application identified on page 1 which has been incorporated by reference. Of course, those skilled in the art will recognize that more or fewer than three bus masters could be incorporated into the scheme of FIG. 8 and that a state machine implementation of an arbiter is not required for the present invention. As an alternative, an ordered list of bus masters could be provided all of which are held off on the single condition that the cache controller is about to perform a predetermined cache operation.

Although the present invention can be applied to computer architecture wherein any type of central processor is employed, exemplary embodiments described herein refer to operations of the MPC601 processor. This processor could be bus master 10 in FIG. 1 or another bus master, not illustrated, which shares the resources illustrated in FIG. 1.

Further, the present invention has been described generally with respect to a single internal latch within cache controller 18 which is used to perform various functions. However, those skilled in the art will appreciate that the internal latch generally depicted in FIG. 5 can be a plurality of single bit latches which are created on the silicon of the controller chip. Depending upon design considerations such as the amount of available silicon, the internal latches for the address bits needed by cache controller 18 to drive the address bus for cache operations, e.g., A12:A28, may also be used for other purposes or may be dedicated to this function. In either case, however, latching need be provided for only the number of bits required for this purpose, e.g., 17, unlike conventional systems using external latches which are constrained by the availability and cost of various size latches.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What I claim is:

1. A method for managing a cache memory comprising the steps of:

asserting, by a bus master, an address on an address bus;

latching said address within a cache controller;

signalling, from said cache controller, that said address has been transferred;

terminating assertion of said address on said address bus by said bus master;

signalling, from said cache controller to an address arbiter, that a cache operation is starting;

preventing, by said address arbiter, assertion of another address on said address bus; and driving, by said cache controller, said internally latched address on said address bus until said cache operation involving said address has been completed.

2. The method of claim 1, wherein said cache operation is a cache allocation.

3. The method of claim 1, wherein said cache operation is a tag invalidation operation.

4. The method of claim 1, wherein said step of latching further comprises the step of:

latching only address bits needed by said cache controller for said cache operation.

5. A method for allocating data to a cache memory from a main memory comprising the steps of:

identifying a memory transaction as a cache miss;

placing address information stored in an internal latch of a cache controller on an address bus;

retrieving said data from said main memory; and allocating said data to said cache memory using said address information placed on said address bus.

6. A method for invalidating tag information in a cache memory directly serving plural bus masters comprising the steps of:

identifying a memory transaction as a cache hit;

driving an address bus with an address internally latched by said cache controller; and invalidating a tag entry of said cache memory using the internally latched address.

7. A memory management system comprising:

an address bus for conveying address information between at least one bus master, a cache controller and a cache memory;

wherein said cache controller includes an internal latch for holding said address information; and an arbiter for controlling access to said address bus and for preventing said at least one bus master from obtaining control over said address bus when said cache controller places said held address information onto said address bus again to enable a cache memory operation.

8. The system of claim 7, wherein said cache memory operation is a cache allocation.

9. The system of claim 7, wherein said cache memory operation is a tag invalidation operation.

10. The system of claim 7, further comprising:

at least one signal line between said cache controller and said arbiter which can be driven by said cache controller to instruct said arbiter to prevent said at least one bus master from acquiring said address bus until said cache memory operation is completed.

11. A system for performing transactions, comprising:

a bus master having access to an address bus;

a main memory;

a cache memory associated with said bus master, said cache memory facilitating interchange of information between said main memory and said bus master;

a cache controller, associated with said bus master, for controlling said cache memory;

logic for asserting, by said bus master, an address on said address bus;

a latch, within said cache controller, for storing said address asserted by said bus master;

logic for signalling, from said cache controller, that said address has been latched;

logic for terminating assertion of said address on said address bus by said bus master;

an address arbiter for preventing assertion of another address on said address bus; and logic for driving, by said cache controller, said internally latched address on said address bus until said cache operation involving said address has been completed.

* * * * *